United States Patent [19]

Kopecko et al.

[11] 4,388,846
[45] Jun. 21, 1983

[54] FIXTURE FOR RESURFACING VEHICLE BRAKE DISCS

[76] Inventors: William L. Kopecko, P.O. Box 183; Robert L. Fuller, 309 Alban St.; Joseph O. Duchac, Rte. 6, all of Rhinelander, Wis. 54501

[21] Appl. No.: 319,451

[22] Filed: Nov. 10, 1981

Related U.S. Application Data

[63] Continuation-in-part of Ser. No. 171,312, Jul. 23, 1980, Pat. No. 4,336,730.

[51] Int. Cl.³ .................................................. B23B 5/04
[52] U.S. Cl. .................................................. 82/4 A
[58] Field of Search .................... 82/4 A; 51/DIG. 3 A

[56] References Cited

U.S. PATENT DOCUMENTS

| | | | |
|---|---|---|---|
| 3,871,066 | 3/1975 | Mitchell | 82/4 A |
| 4,140,032 | 2/1979 | Besenbruch et al. | 82/4 A |
| 4,151,766 | 5/1979 | Eichenhofer | 82/4 A |
| 4,226,146 | 10/1980 | Ekman | 82/4 A |

FOREIGN PATENT DOCUMENTS

| | | | |
|---|---|---|---|
| 2540187 | 3/1977 | Fed. Rep. of Germany | 82/4 A |
| 2745111 | 4/1979 | Fed. Rep. of Germany | 82/4 A |
| 2804840 | 8/1979 | Fed. Rep. of Germany | 82/4 A |

*Primary Examiner*—Leonidas Vlachos
*Attorney, Agent, or Firm*—James E. Nilles

[57] ABSTRACT

A fixture and method for simultaneously resurfacing opposite sides of a vehicle disc brake without removing the disc from the vehicle. The wheel of the vehicle and the hydraulic caliper for the disc are removed and the disc is then rotatably driven while opposite sides of the disc are resurfaced. A resurfacing tool fixture is removably mounted directly on the vehicle, for instance on the caliper mount bracket adjacent the disc, and the fixture has a shiftable frame having a pair of opposed carbide tipped tools which engage opposite sides of the disc and which are moved across the entire surface of the disc for complete resurfacing thereof, all without removing the disc from the mounting in the vehicle.

8 Claims, 19 Drawing Figures

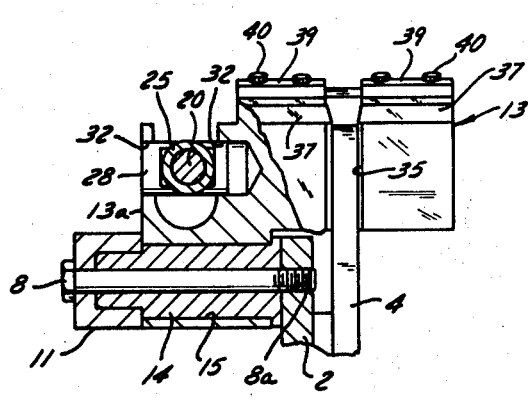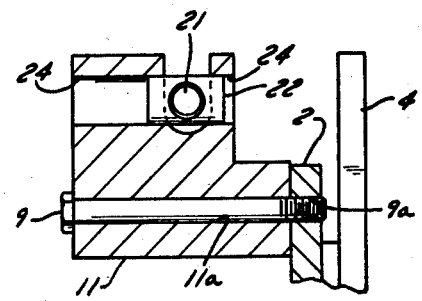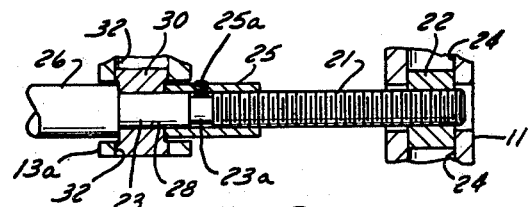

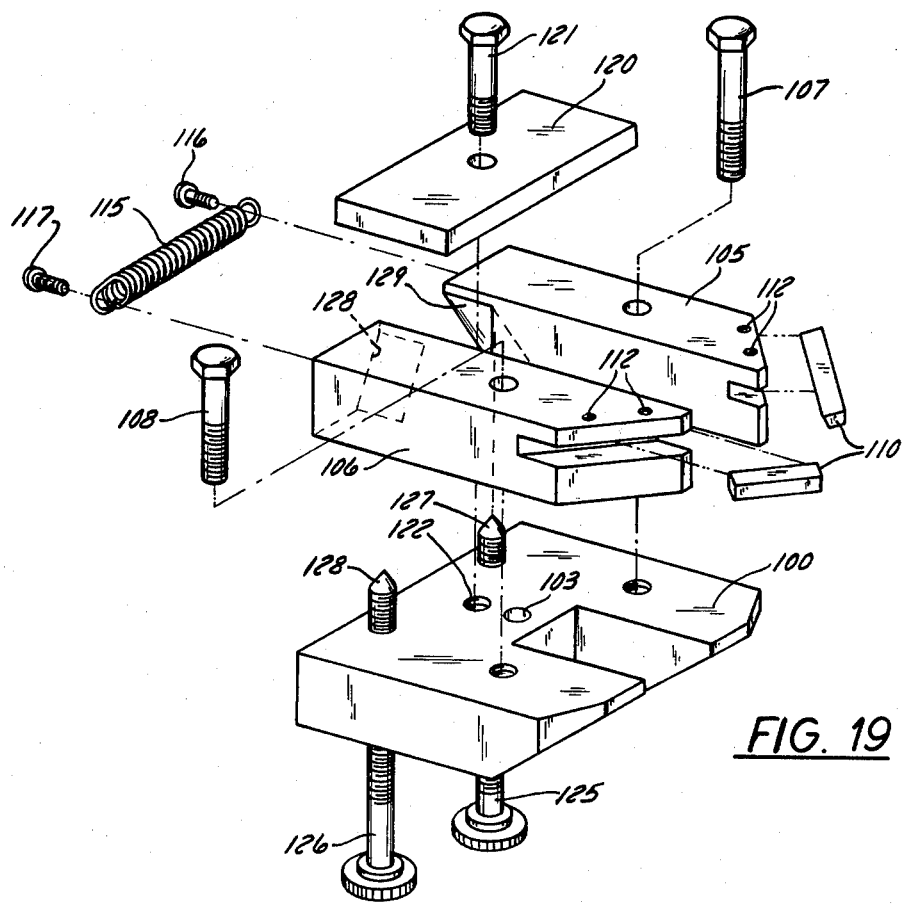
FIG. 19
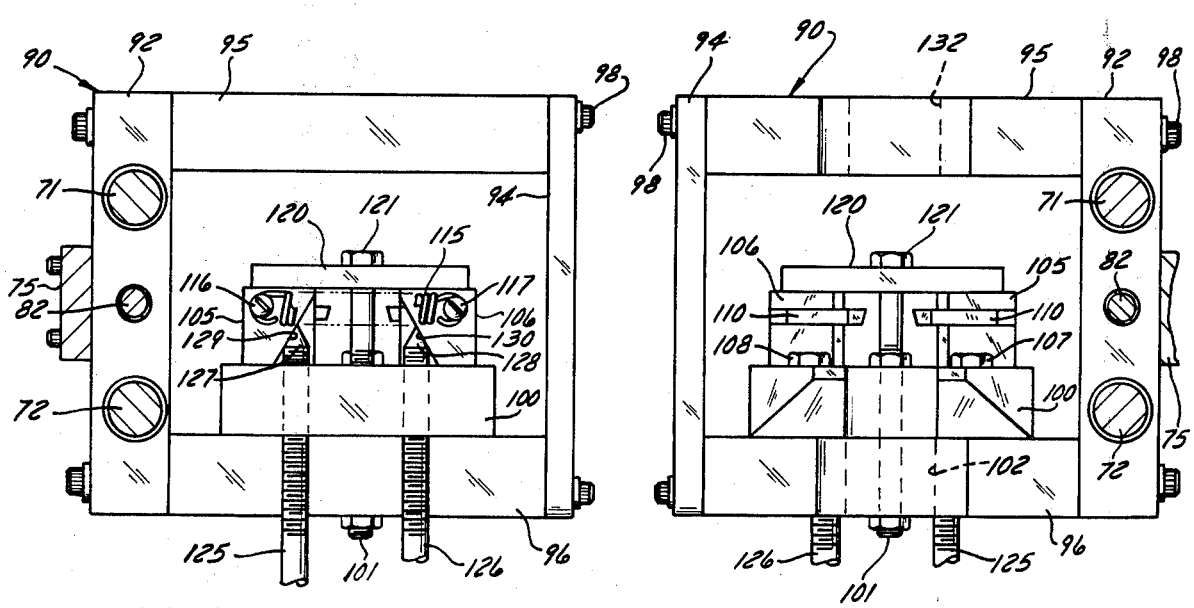
FIG. 17
FIG. 18

FIXTURE FOR RESURFACING VEHICLE BRAKE DISCS

REFERENCE TO A CO-PENDING APPLICATION

This is a Continuation-in-part application of U.S. Ser. No. 171,312 filed July 23, 1980, which issued on June 29, 1982, as U.S. Pat. No. 4,336,730.

BACKGROUND OF THE INVENTION

The invention pertains to a fixture for resurfacing brake discs of a vehicle. Various prior art devices have heretofore been proposed for simultaneously resurfacing both opposite sides of a brake disc of a vehicle. However some of these prior art devices have required that the brake disc be removed from the vehicle for such an operation, or have attached the fixture to the vehicle with special mounts. Examples of some prior art devices are shown in the U.S. Pat. No. 3,710,661 issued Jan. 16, 1973 wherein the disc is set up in a lathe for the resurfacing operation, and another prior art example of this type is shown in the U.S. Pat. No. 3,626,793 issued Dec. 14, 1971.

These prior art fixtures required a considerable amount of time to remachine the brake discs.

SUMMARY OF THE PRESENT INVENTION

The present invention provides a fixture for simultaneously resurfacing opposite sides of a vehicle wheel disc brake without removing the disc from the vehicle but only requiring that the wheel itself and the caliper for the disc be removed. The fixture of the present invention is removably mounted on the vehicle, for example on the caliper mount bracket of the vehicle and includes a shiftable tool holder frame having a pair of tool bits that embrace the disc while the disc is rotatably driven. The tool bits, such as carbide tipped bits are carried by the tool holder adjacent the disc and simultaneously engage opposite sides of the disc. The tool holder frame and its tools are shifted so that the tools engage and pass over the opposite sides of the disc as the latter rotates thereby resurfacing the disc while it is still in place on the vehicle. After the required number of passes are made over the disc, the fixture can be easily removed from the vehicle. A more specific aspect of the invention relates to a stationary frame of the fixture being mounted on the caliper mount bracket and also a shiftable tool holder frame which can move relative to the fixed frame, and adjustable means are provided between the frames for shifting of the tool holder frame and in particular its tool bits over the entire opposite surfaces of the disc. The fixture provided by the present invention is particularly compact, easy and efficient to use, and can be readily attached and detached from a vehicle and in working relationship relative to the disc being resurfaced.

Another aspect of the invention relates to such a fixture that is adjustable to accommodate different vehicles having different spacing between the discs and their caliper brake mount bracket, and for accommodating discs of different thicknesses.

A more specific aspect of the invention relates to such a fixture wherein the disc is rotated through its live axle and driven by the power of the engine of the vehicle. In the event that the disc to be resurfaced is not driven by the engine, a separate drive means is provided for rotating the disc and this drive means includes a hub adapter which can be rigidly secured to the wheel hub and through which the disc is then rotated, for example, by a separate electric motor or other power source.

These and other objects and advantages of the present invention will appear hereinafter as this disclosure progresses, reference being had to the accompanying drawings.

BRIEF DESCRIPTION OF THE DRAWINGS

FIG. 5 is a cross-sectional view taken generally along the line 5—5 in FIG. 3, but on an enlarged scale and showing the fixture in the position where the tools are in a retracted position, that is out of contact with the disc;

FIG. 6 is a sectional view taken along the line 6—6 in FIG. 5 and showing the pivotal mounting of the swingable frame on the caliper mount bracket;

FIG. 7 is a cross-sectional view taken along the line 7—7 in FIG. 5 and showing the fixed frame of the fixture mounted on the caliper mount bracket;

FIG. 8 is a sectional view along the line 8—8 in FIG. 5 and showing the adjustable means and its connection between the swingable frame and the fixed frame;

FIGS. 11 through 19 show a modification of the invention;

FIG. 11 is a perspective view of a resurfacing tool fixture made in accordance with the present invention and shown as applied to a caliper mount bracket, the view being taken generally from the side of the vehicle and showing the wheel removed to fully expose the vehicle brake disc which is to be resurfaced, and showing the outline of the vehicle body in phantom line;

FIG. 12 is another perspective view of the fixture shown in FIG. 11, but taken more generally from the top thereof and also showing the fixture when it has been shifted into tool engaging contact with the brake disc;

FIG. 13 is a plan view of the fixture when it is in the position shown generally in FIG. 12;

FIG. 14 is a view similar to FIG. 13 but showing the fixture when the shiftable frame has been retracted so as to retract the tool bits from contact with the brake disc;

FIG. 15 is a vertical cross-sectional view of the fixture, taken generally along the line 15—15 in FIG. 13, but when the shiftable frame has been retracted so the tool bits are out of contact with the brake disc;

FIG. 16 is a vertical sectional view, taken along the line 16—16 in FIG. 13, but on a reduced scale and showing the adjusting screw for moving the shiftable frame and the tool bits carried thereby, towards and away from the brake disc;

FIG. 17 is a transverse sectional view taken generally along the line 17—17 in FIG. 15 and showing the tool holder feed screws which contact the spring biased tool holder to thereby urge the tool bits apart from one another and against the bias of the spring;

FIG. 18 is a transverse sectional view taken generally along the line 18—18 in FIG. 19; and FIG. 19 is an exploded, perspective view of the tool holder plate, the tool holders which are pivotally secured to the tool holder plate, the tool bits which are secured to the tool holders, the tension spring for biasing the tool bits away from one another and the tool holder feed screws for urging the tool holders towards one another and more particularly into contact with opposite sides of the brake disc to be resurfaced.

DESCRIPTION OF ONE PREFERRED EMBODIMENT

Figure 1:
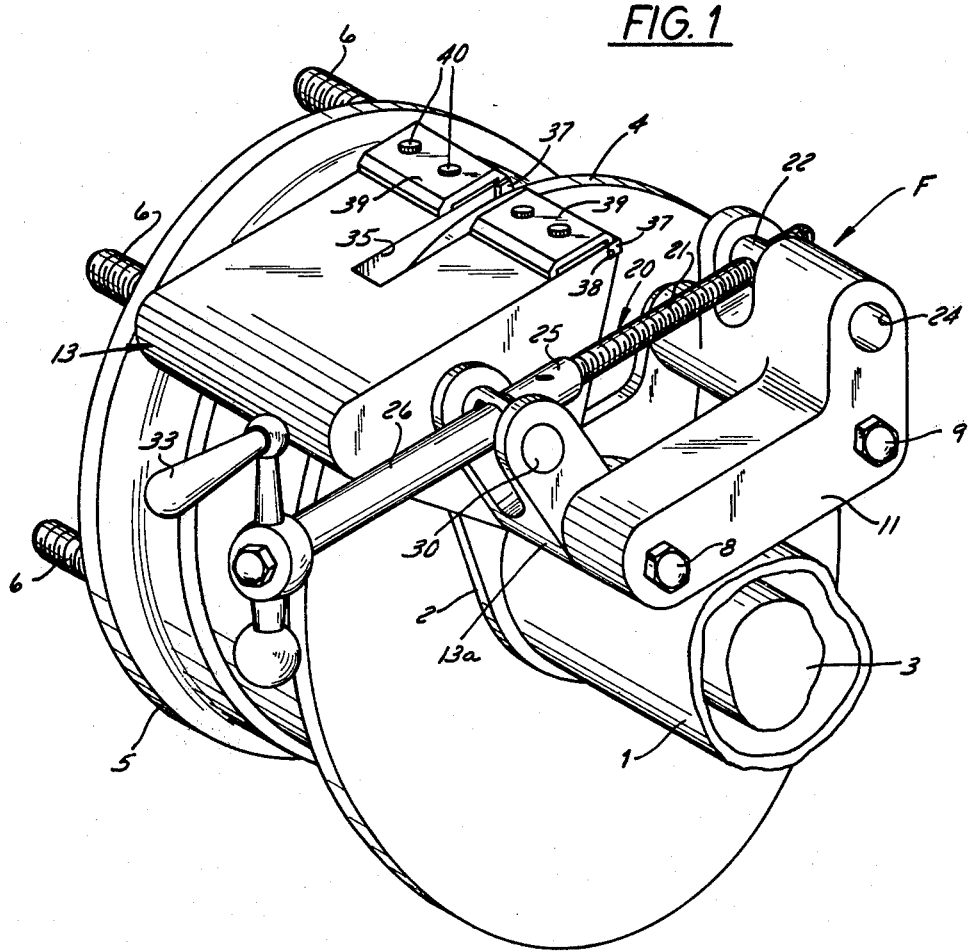
FIG. 1 is a perspective view of the fixture provided by the present invention and is mounted on the caliper mount bracket of the vehicle, the wheel of the vehicle having been removed and the axle housing and axle being shown as broken away and in section.
Figure 2:
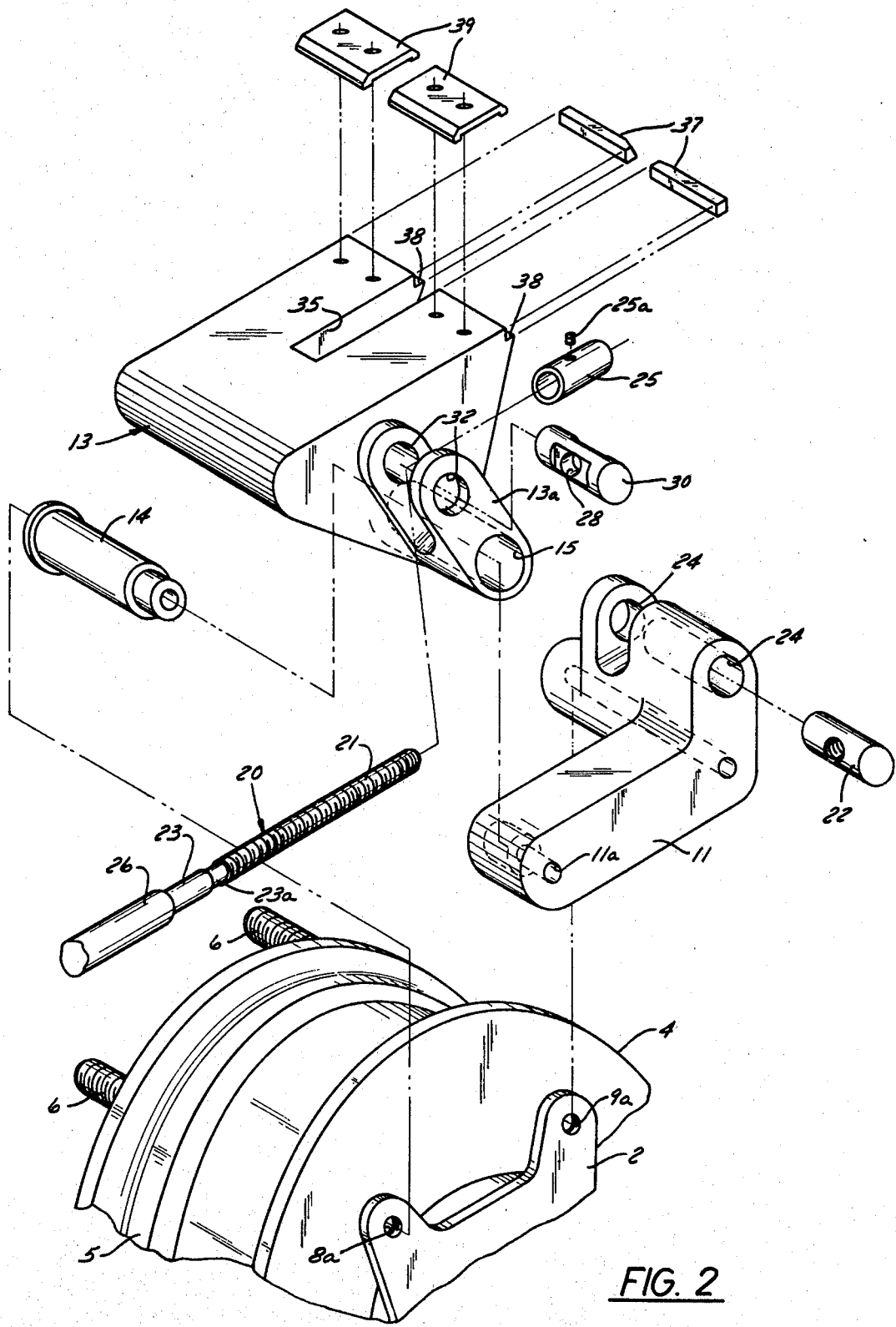
FIG. 2 is an exploded, perspective and partially fragmentary view of the fixture shown in FIG. 1.
Figure 3:
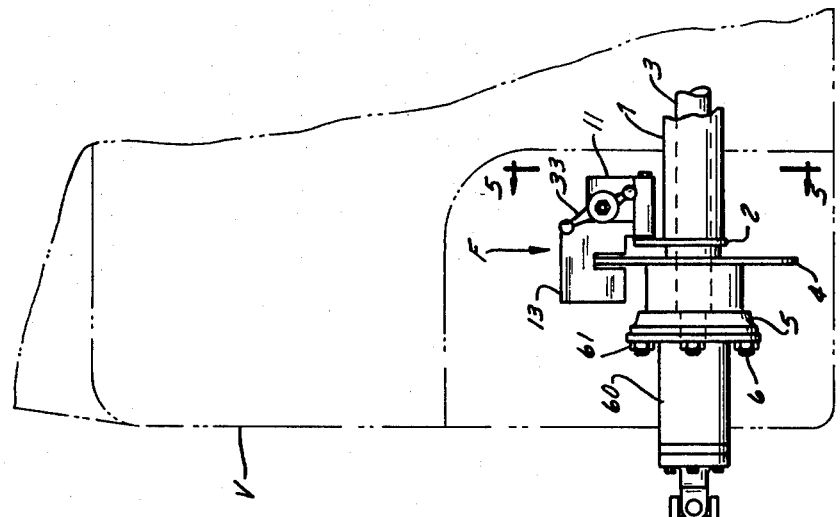
FIG. 3 is a side elevational view of the resurfacing fixture of the present invention, but on a reduced scale and showing a separate means for rotatingly driving the disc during the resurfacing operation.
Figure 4:
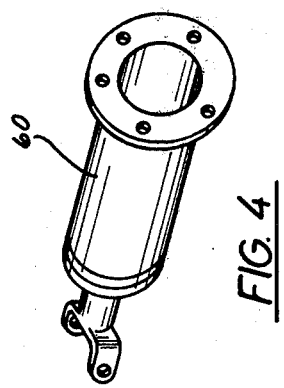
FIG. 4 is a perspective view of the adapter shown in FIG. 3, but on a slightly enlarged scale.
Figure 10:
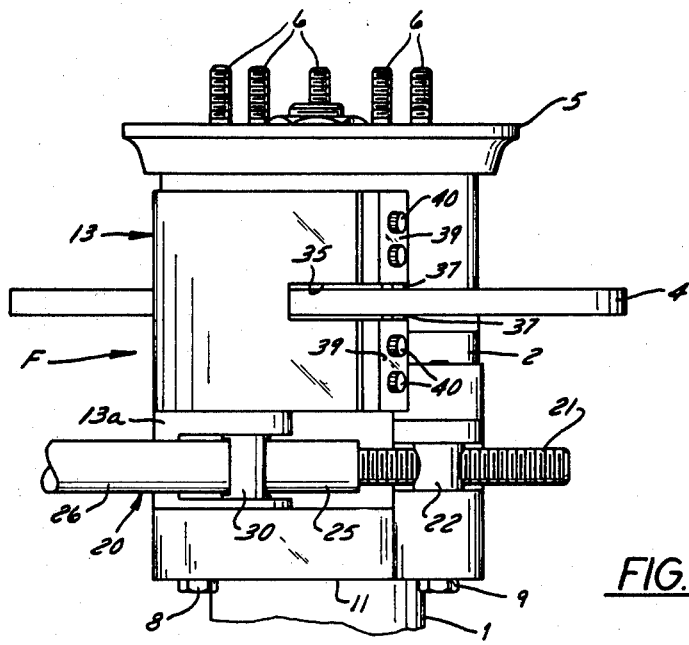
FIG. 10 is a top view of FIG. 9.

In FIG. 3, the vehicle V has been indicated diagrammatically by the broken line and includes the axle housing 1 to which the caliper mount bracket 2 is rigidly secured. An axle 3 extends through the axle housing and the vehicle brake disc 4 is secured to that axle for rotation thereby. The disc is located adjacent the hydraulic caliper mount bracket so that the hydraulic caliper (not shown) which is otherwise mounted on the bracket 2 extends over the disc brake in the known manner. Tne vehicle also includes the wheel hub 5 which has threaded studs 6 extending therefrom and on which the wheel (not shown) of the vehicle is mountable in the known manner. The fixture F provided by the present invention is shown as attached to the caliper mount bracket 2 and for this purpose the two large bolts 8 and 9 (FIG. 1) extend through the fixture and are threadably engaged in the threaded holes 8a and 9a, respectively of the caliper mounted bracket 2. Holes 8a and 9a are the same holes that are used to mount the hydraulic caliper in operative relationship to the disc 4.

More specifically, the resurfacing tool fixture F includes a fixed frame 11 which is generally of L-shape and through which the bolt 9 extends to rigidly hold it on the caliper mount bracket 2. The fixture also includes a shiftable frame 13 including a bifurcated off-set portion 13a that has a pivotal mounting on the vehicle, for example on the bracket 2 by means of the large bolt 8 which extends through the aperture 11a of the fixed frame 11 and a standoff-sleeve bearing 14 which in turn extends through a large aperture 15 of the swingable frame. In this manner, the swingable frame can be oscillated relative to the fixed frame and relative to the adjacent disc 4.

Figure 9:
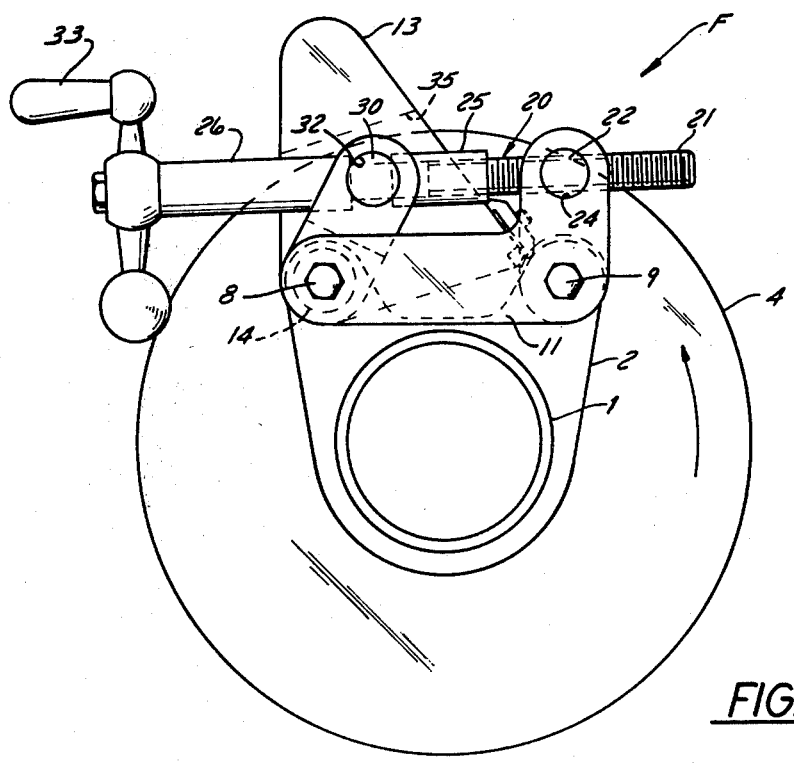
FIG. 9 is a view similar to FIG. 5 but showing the adjustable means turned to a position wherein the swingable frame has been swung inwardly to an extent in which the tools have passed over a portion of the disc surface.

An adjustable means is provided for shifting or swinging the frame 13 relative to the fixed frame 11 and relative to the disc as follows. A manually rotatably and elongated threaded member 20 has a threaded portion 21 that is threadably engaged in an internally threaded bushing 22 that is mounted in the aperture 24 formed in the fixed housing 11. The elongated threaded member 20 also includes a rod 26 that can rotate relative to the threaded portion 21 as clearly shown in FIG. 8. The rod 26 is rotatably mounted in a bore 28 in the swivel 30 which in turn is mounted in the aperture 32 of the bifurcated portion 13a of the swingable frame 13. A hand crank 33 is fixed to the elongated end of the threaded member so that the operator can rotate the crank which in turn causes rotation of the threaded portion 21 and consequent travel of the threaded member 22 therealong. Because the frame 11 is fixed, rotation of the crank 33 causes the swingable frame 13 to swing in one direction or the other relative to the fixed frame 11 and relative to the disc 4. As shown in FIG. 5, the crank 33 has been turned to a position in which the swingable frame has been retracted wherein FIG. 9 shows the position of the swingable frame 13 when in the disc resurfacing position as will appear.

The swingable frame defines a slot 35 which extends partially through the swingable frame and is arranged so that the disc 4 is engagable in the slot as the swingable frame is swung relative to the disc. A pair of cutting tools in the form of carbide tool bits 37 are set in the recesses 38 located along the edge of the swingable frame and are held captive therein by clamps 39 and the cap bolts 40 that are threadably engaged in the swingable member. The inner ends of the bits are set to contact the opposite surfaces of the disc so that as the swingable frame and its tools are swung from the position shown in FIG. 5 and inwardly to a position shown in FIG. 9, the tools will resurface the sides of the discs. The swingable frame 13 can be swung inwardly further from that shown in FIG. 9 so as to completely move across the entire surface of the disc.

It will be noted that the swingable frame is made with a slot 35 and thereby results in a one-piece frame which is of particularly rigid construction and which enables an accurate and even cut simultaneously on both sides of the disc. The cutting tools can be adjusted relative to the sides of the disc to furthermore ensure accurate resurfacing.

FIGS. 11-19 EMBODIMENT

Figure 11:
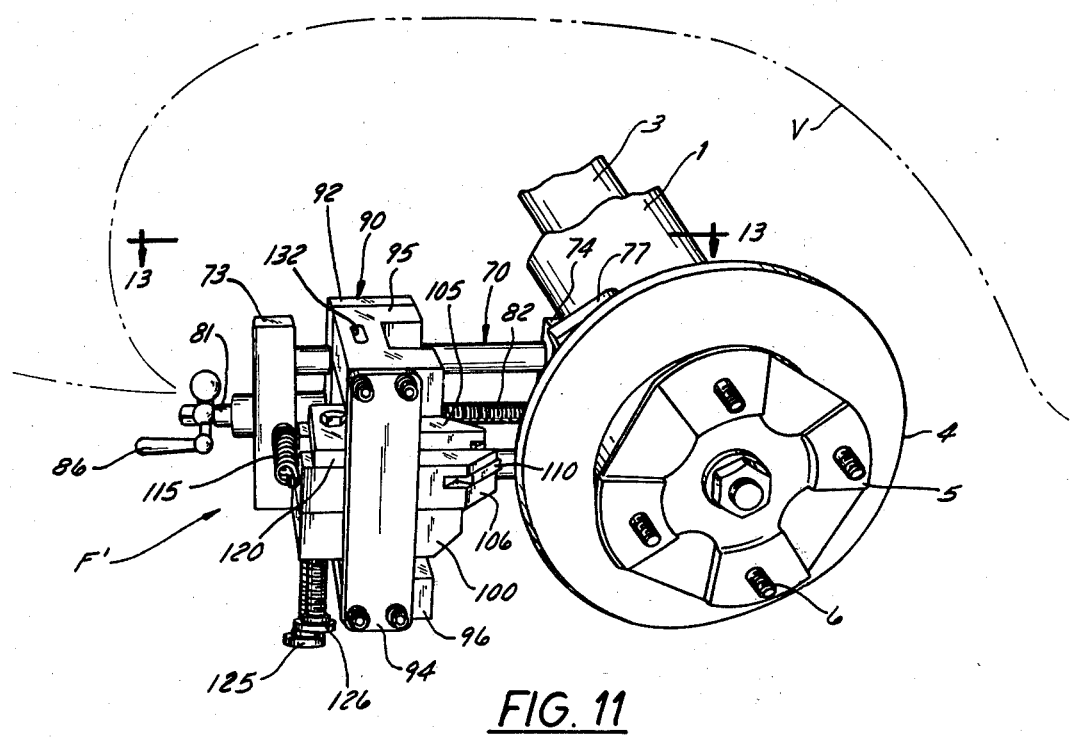

In FIG. 11 the vehicle body V has been indicated diagrammatically by the phantom line, and the vehicle includes the axle housing 1 to which the caliper mount bracket 2 is rigidly secured. As described in connection with the FIGS. 1-10 fixture, the wheel axle 3 extends through the axle housing 1 and the vehicle brake disc 4 is secured to that axle for rotation thereby. The disc is located adjacent the hydraulic caliper mount bracket 2 so that the hydraulic caliper (not shown) which, when the vehicle is operative, is mounted on the caliper brake mounting bracket 2 and extends over the disc brake in the known manner. The vehicle also includes the wheel hub 5 which has threaded studs 6 extending therefrom and on which the wheel (not shown) of the vehicle is mounted in the conventional manner. The fixture F' is attached to the caliper brake mount bracket 2 by the two large bolts 8 and 9 that extend through the fixture and are threadably engaged in the threaded holes of the bracket 2. As previously mentioned, these threaded holes of the caliper bracket are the same holes that are used to mount the caliper brake (not shown) in operative relationship to the disc 4.

The modified form of the resurfacing tool fixture F' includes a fixed frame 70 which includes elongated guide means in the form of two guide rods 71 and 72 which are arranged in parallelism and are secured at their ends to the frame members 73 and 74 forming a rigid fixed frame, together with a rigidifying brace 75. Adjustable means are provided for permitting the fixture to be used with different vehicles having different caliper mount brackets. This means takes the form of links 77 and 78 rigidly mounted by bolts 79 and 80, respectively to the end of the frame 70. These links 77 and 80 are in turn secured by the aforesaid bolts 8 and 9 to the caliper mount bracket 2 after the wheel and caliper brake have been removed. A manually rotatable and elongated threaded member 81, having a threaded portion 82, (FIG. 15) is journalled for rotation in the frame member 74 and is held captive therein by the collars 83 and 84 which are fixed by set screws 85 on the member 81. A crank handle 86 is secured to the end of the member 81 for manually rotating the threaded member. Power means (not shown) may also be used to rotate the threaded member in one direction or another so as to shift the resurfacing tool toward and away from the brake disc 4, as will appear.

Figure 13:
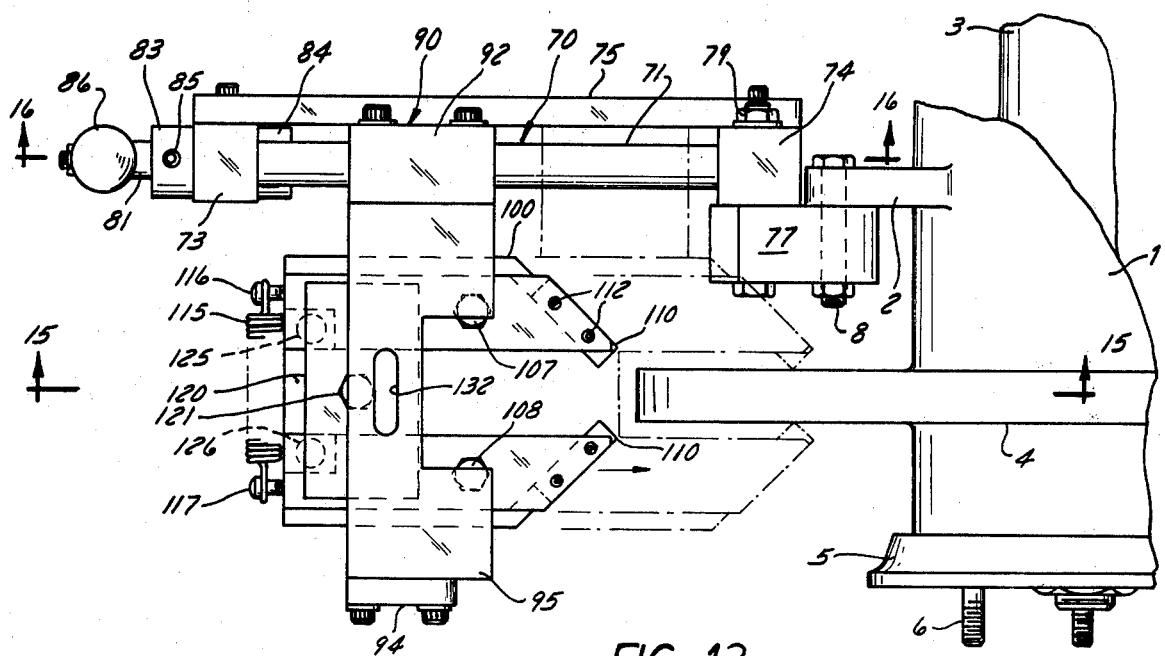
Figure 14:
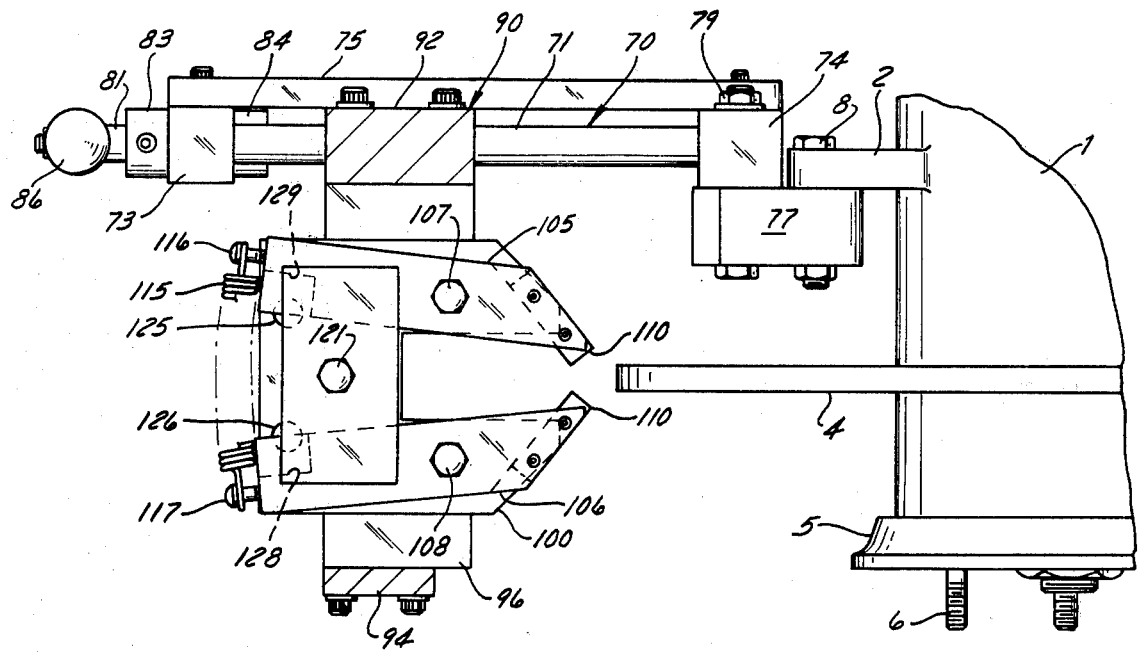
Figure 16:
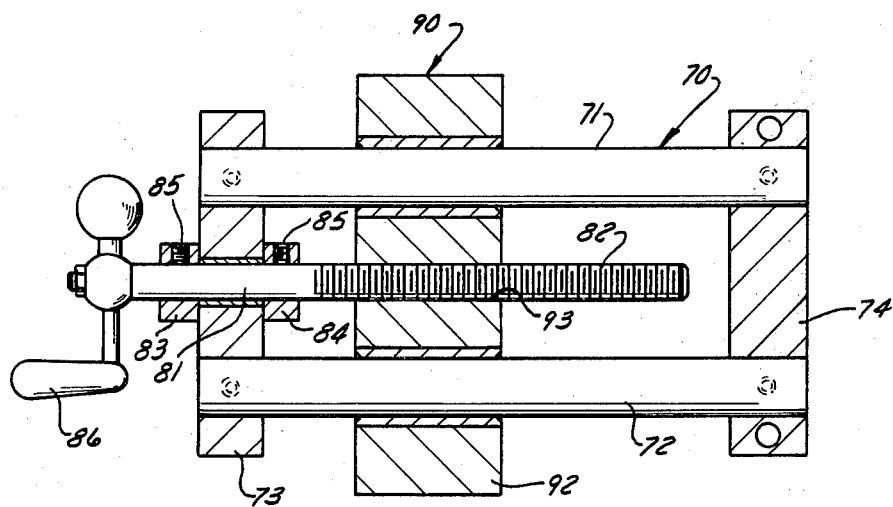

A shiftable tool holder frame 90 is guidingly mounted on the fixed frame for slideable, i.e., reciprocable, movement toward and away from the disc 4 from the position shown in FIG. 14 where the tools are out of engagement with the disc, and the position shown in FIG. 13 where the tools are in resurfacing contact with the disc, as will appear. The shiftable frame includes the upright member 92 which is slideably mounted on the guide rods 71 and 72. The threaded portion 82 of the threaded member 81 is threadably engaged in an internally threaded hole 93 (FIG. 16) in the frame cross member 92. The frame also includes another upright member 94 (FIGS. 17 and 18) and two cross members 95 and 96 which are rigidly secured to and between upright members 92 and 94 by the cap screws 98. Thus, the shiftable frame 90 is reciprocated or shiftable on the fixed frame 70, more specifically on the guide rods 71 and 72 of the fixed frame 70 by means of the elongated threaded member 81.

Figure 15:
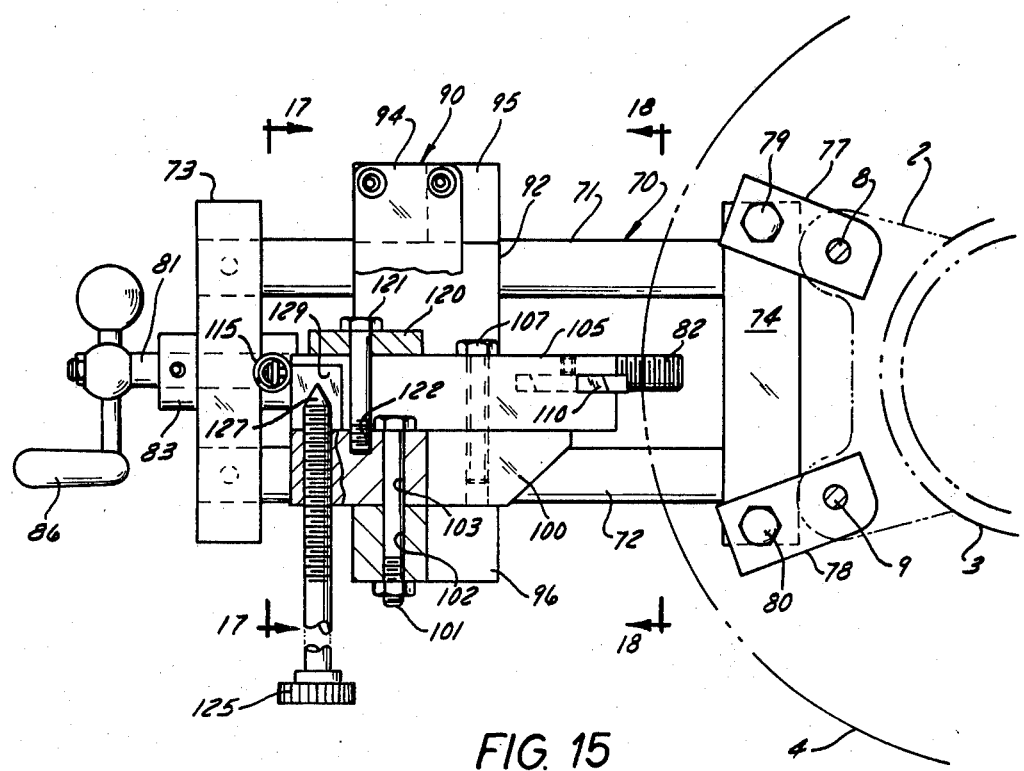

The shiftable frame 90 carries with it a tool holding member 100, now to be described. The tool holding member 100, shown clearly in FIGS. 15 and 19, is adjustably secured to the tool holder member 100 by bolt 101 which extends through a slot 102 (FIGS. 15 and 18) of the cross frame member 96 and the bolt 101 also extends through an aperture 103 (FIGS. 15 and 19) in the tool holding member 100.

A pair of tool holders 105 and 106 are secured to member 100 by means of the bolts 107 and 108, respectively, which threadably engage the tool holder member 100, and tool holders 105 and 106 are free to pivot on their respective bolts 107 and 108. Carbide tool bits 110 are rigidly secured in their respective tool holders 105 and 106 by set screws 112 and these opposed tool bits engage on opposite sides of the brake disc 4 to resurface them by taking a cut thereacross.

The other ends of the tool holders are resiliently urged toward one another by means of the tension springs 115 which is secured to tool holders 105 and 106 by screws 116 and 117, respectively, the tension spring acting to urge the tool bits 110 away from one another, that is to say, out of contact with the opposite sides of the brake disc 4.

A clamp plate 120 (FIGS. 7, 8 and 9) is secured by bolt 121 for holding the tool holders in operative position to prevent tool chatter. More specifically, the bolt means 121 is threadably engaged in a threaded aperture 122 (FIG. 19) of the tool holder member 100, and by tightening bolt 121, the plate 120 acts to rigidly clamp the tool holders in their cutting position to which they have been adjusted by the tool holder feed screws 125 and 126. The tool holder feed screws are threadably engaged in the tool holder member 100 and have pointed inner ends 127 and 128 respectively, which bear against inclined surfaces 129 and 130 (FIGS. 15, 17 and 19) formed in the ends of the tool holders which are opposite to the cutting tool bits 110. By turning the screws 125 and 126 inwardly, their pointed ends move along the respective inclined surfaces 129 and 130 of the tool holders, thereby urging the tool bits at the other end of the tool holders towards one another so that they can be adjusted into proper resurfacing contact with opposite sides of the disc 4.

Thus the tool holder member 100, the tool holders 105 and 106, the tool bits 110, and the tool holder feed screws 125 and 126 are all carried as a unit on the shiftable frame 90 for movement therewith. In addition, the tool holders and their tool bits are also adjustable on the bifurcated tool holder member 90 and relative to one another to thereby accommodate discs of various thickness, and to vary the degree of pressure the bits exert on the sides of the disc 4.

Figure 12:
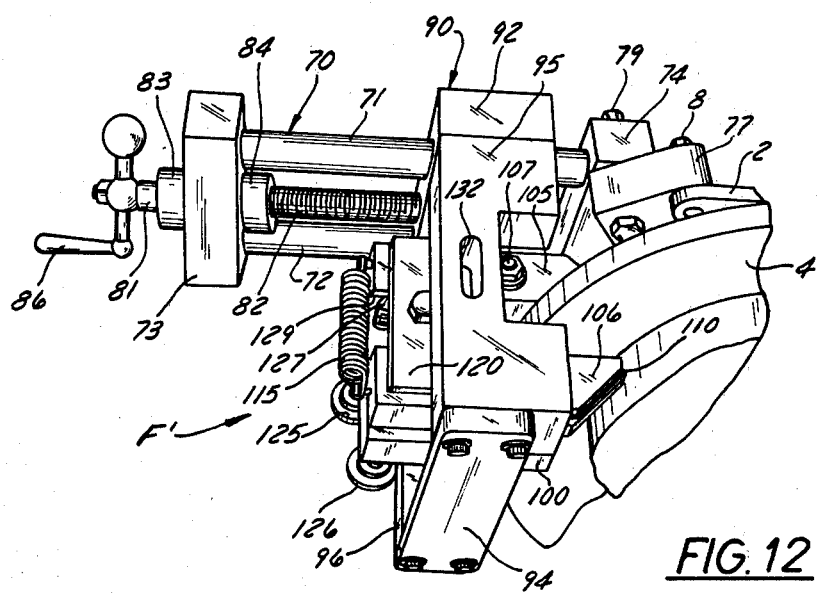

Thus the tool holder member 100 and its associated parts can be shifted to any adjusted position in an axial direction with respect to the disc 4. This adjustment permits the tool holder member 100, and the tool bits 110 to engage the brake discs 4 regardless of axial position of said discs, that is to say, the present fixture can accommodate various makes of vehicles which have different axial spacings of the brake discs 4 from their caliper brackets 2. At the same time the fixed frame can be mounted on caliper mount brackets of various vehicles, for one thing because the adjustable links 77 and 78 can be swung away from or toward one another (see FIG. 15) to adjust for various spacings of the threaded holes 8 and 9 in different caliper mount brackets. The present resurfacing tool fixture is thus highly flexible as to the types and models of vehicles it can accommodate for resurfacing brake discs. The fixture can also be used for either left or right hand wheels of the vehicles by simply turning the fixture over 180°, and the tool plate member 100 is then mounted on the cross frame member 95 which also contains an elongated slot 132 (see FIGS. 11 and 12) for that purpose. The discs can be driven by the vehicle engine during the resurfacing operation. For example one disc may be resurfaced when it is driven in a forward direction, and the opposite disc resurfaced when driven in the reverse direction.

The present invention is useable in situations where the discs are power driven by the engine of the vehicle through the live axle and can also be used where the axle is not driven, but in that case the driving means as shown for example in FIG. 3, would be utilized. That driving means includes a hub adapter 60 which is secured by nuts 61 to the hub studs 6 and which is connected by the telescoping double universal joint shaft 62 to a source of power such as for example a one-third horsepower electric motor 64 that drives the shaft through the gear reducer 65.

RECAPITULATION

With the present invention, an auto service mechanic can remachine the caliper disc without removing the disc hub from the vehicle.

The present invention thus provides a fixture for simultaneously resurfacing opposite sides of a vehicle wheel disc brake and without removing the disc from the vehicle. It is only necessary to remove the wheel and also the hydraulic caliper, leaving the caliper mount bracket in place. The mount bracket forms a convenient and accurate member for securing the fixture of the present invention in place. The disc can be rotated either by an auxiliary power source or by the engine on the vehicle itself while the operator turns the crank to swing the tools across both surfaces of the disc being resurfaced.

The entire fixture can be easily and quickly attached to the vehicle frame and removed therefrom when the resurfacing operation is completed.

We claim:

1. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having elongated guide means thereon, adjustable mounting means for rigidly and removably mounting said frame on said caliper mount bracket when said caliper brake has been removed from said bracket, said adjustable mounting means including a pair of links connected between and to said fixed frame and said caliper mount bracket for accommodating different caliper mount brackets, a shiftable tool holder frame having means for being shiftably mounted on said fixed frame guide means, adjustable positioning means connected between said fixed frame and said shiftable frame for shifting the latter relative to said fixed frame and said disc, said shiftable frame having a pair of cutting tools carried by said shiftable tool holder frame and locatable one on each side of said disc for simultaneous cutting contact with opposite sides of said disc as said shiftable frame is shifted on said fixed frame guide means by actuation of said adjustable positioning means.

2. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having elongated guide means thereon, said elongated guide means comprising a pair of spaced apart guide means arranged in parallelism, adjustable and swingable link mounting means for rigidly and removably mounting said frame on said caliper mount bracket when said caliper brake has been removed from said bracket, a shiftable tool holder frame having means for being slidably mounted on said guide rods, adjustable positioning means connected between said fixed frame and said shiftable frame for shifting the latter relative to said fixed frame and said disc, said shiftable frame having a pair of cutting tools carried by said shiftable tool holder frame and locatable one on each side of said disc for simultaneous cutting contact with opposite sides of said disc as said shiftable frame is shifted on said fixed frame guide means by actuation of said adjustable positioning means.

3. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having elongated guide means thereon, said elongated guide means comprising a pair of spaced apart guide rods arranged in parallelism, adjustable mounting means for rigidly and removably mounting said frame on said caliper mount bracket when said caliper brake has been removed from said bracket, said adjustable mounting means including a pair of links connected between and to said fixed frame and said caliper mount bracket for accommodating different caliper mount brackets, a shiftable tool holder frame having means for being slidably mounted on said guide rods, adjustable positioning means connected between said fixed frame and said shiftable frame for shifting the latter relative to said fixed frame and said disc, said shiftable frame having a pair of cutting tools carried by said shiftable tool holder frame and locatable one on each side of said disc for simultaneous cutting contact with opposite sides of said disc as said shiftable frame is shifted on said fixed frame guide means by actuation of said adjustable positioning means.

4. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having a pair of parallel guide rods, adjustable and swingable link mounting means for rigidly and removably mounting said frame on said caliper mount bracket when said caliper brake has been removed from said bracket, a shiftable tool holder frame having an upright member through which said guide rods extend to slidably mount said tool holder frame on said fixed frame, said tool holder frame also having a pair of cross members secured to said upright member, said shiftable tool holder frame also including a tool holder member, said tool holder member being selectively secured to either of said cross members for resurfacing either the left or right hand wheels of said vehicle, adjustable positioning means connected between said fixed frame and said shiftable tool holder frame for shifting the latter relative to said fixed frame and said disc, said shiftable tool holder frame having a pair of cutting tools carried by said shiftable tool holder frame and locatable one on each side of said disc for simultaneous cutting contact with opposite sides of said disc as said shiftable frame is shifted on said guide rods by actuation of said adjustable positioning means.

5. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having elongated guide means thereon, said elongated guide means comprising a pair of spaced apart guide rods arranged in parallelism, adjustable and swingable link mounting means for rigidly and removably mounting said frame on said caliper mount bracket when said caliper brake has been removed from said bracket, a shiftable tool holder frame having an upright member through which said guide rods extend to slidably mount said tool holder frame on said fixed frame, said tool holder frame also having a pair of cross members secured to said upright member, said shiftable tool holder frame also including a tool holder member, said tool holder member being selectively secured to either of said cross members for resurfacing either the left or right hand wheels of said vehicle, adjustable positioning means connected between said fixed frame and said shiftable tool holder frame for shifting the latter relative to said fixed frame and said disc, said shiftable tool holder frame having a pair of cutting tools carried by said shiftable tool holder frame and locatable one on each side of said disc for simultaneous cutting contact with opposite sides of said disc as said shiftable frame is shifted on said guide rods by actuation of said adjustable positioning means.

6. A resurfacing tool fixture for simultaneously resurfacing both of the opposite sides of a brake disc for a vehicle wheel without removing said disc from said vehicle but when said wheel has been removed, said vehicle having a caliper brake mount bracket adjacent said disc for removably mounting a caliper brake thereon, said fixture comprising a fixed frame having elongated guide means thereon, said elongated guide means comprising a pair of spaced apart guide rods arranged in parallelism, adjustable mounting means for rigidly and removably mounting said frame on said caliper mount bracket when said caliper brake has been removed from said bracket, said adjustable mounting means including a pair of links connected between and to said fixed frame and said caliper mount bracket for accommodating different caliper mount brackets, a shiftable tool holder frame having an upright member through which said guide rods extend to slidably mount said tool holder frame on said fixed frame, said tool holder frame also having a pair of cross members secured to said upright member, said shiftable tool holder frame also including a tool holder member, said tool holder member being selectively secured to either of said cross members for resurfacing either the left or right hand wheels of said vehicle, adjustable positioning means connected between said fixed frame and said shiftable tool holder frame for shifting the latter relative to said fixed frame and said disc, said shiftable tool holder frame having a pair of cutting tools carried by said shiftable tool holder frame and locatable one on each side of said disc for simultaneous cutting contact with opposite sides of said disc as said shiftable frame is shifted on said guide rods by actuation of said adjustable positioning means.

7. The fixture set forth in claims 1 or 2, or 3 or 4, or 5 or 6 including,
   a pair of tool holders pivotally mounted on said tool holder frame,
   a tool holder feed screw on said tool holder frame for each of said tool holders to adjust the distance of said holders with respect to the opposite sides of said brake disc,
   and clamp means carried by said tool holder frame and bearing against said tool holders for rigidly clamping the latter in their adjusted position.

8. The tool fixture as set forth in claim 1 or 3 or 6 in which said pair of links are releasably secured to said fixed frame and said caliper mount bracket by bolt means.

* * * * *